Patented May 8, 1945

2,375,279

UNITED STATES PATENT OFFICE 2,375,279

FAT-SOLUBLE VITAMIN PRODUCT

Loran O. Buxton, Newark, and André E. Briod, Short Hills, N. J., assignors to National Oil Products Company, Harrison, N. J., a corporation of New Jersey No Drawing. Application May 7, 1942, Serial No. 442,078

8 Claims. (Cl. 99—11)

This invention relates in general to the manufacture of vitamin fortified foods, and more particularly to stable high potency vitamin-containing products in dry form for use in the vitamin fortification of feeds and foods.

Much work has been done on the problem of enriching foods and feeds with fat-soluble vitamins. In particular, there has been a great deal of research on the problem of the fortification of foods without affecting the normal taste and odor thereof, especially in the case of the fortification of foods with vitamins contained in fish liver oils and concentrates thereof. The most important problem, however, has been to devise means of inhibiting oxidation and destruction of the vitamins after they have been incorporated into the food products. Various methods of producing stable, dry vitamin-fortified products have been proposed; for example, one suggestion has been to impregnate dried yeast with cod liver oil and to coat the impregnated yeast particles with Karaya gum by dispersing the yeast particles in a solution of the gum and subsequently drying said particles. Another proposal has been to mix fish liver oils with liquid paraffin wax and then to impregnate dry granular vegetable material therewith, then permit the mass to cool to give vegetable particles which are coated and/or impregnated with a vitamin-containing oil enclosed in a film of paraffin wax. A further proposal has been to combine the use of a wax and a gum in a similar process. The purpose of gums, waxes, etc. is to protect the vitamins against oxidation and destruction by the oxidizing influences of the atmosphere. However, many and various difficulties have been met in the foregoing practices in the way of destruction of the vitamins, etc. Furthermore, the public is rather reluctant to consume foods containing such foreign substances. Moreover, the use of paraffin wax and similar materials is highly undesirable from a physiological standpoint, since such materials are not readily assimilable by the body. Also, such substances tend to interfere with the proper absorption by the body of the vitamins contained in the food or feed.

It is the object of this invention to obviate the foregoing and other disadvantages in the production of fat-soluble vitamin-containing products of a dry nature.

A further object of the invention is to provide fat-soluble vitamin-enriched products in a dry form displaying enhanced stability.

Another object of the invention is to provide an improved process for the production of stable, dry vitamin food products.

Still another object of the invention is to provide improved foods for human and animal consumption fortified with vitamins A and/or D dispersed in a dry carrier.

According to the process of our invention, vitamin products in a dry form are produced by mixing a fat-soluble vitamin-rich material with a carrier comprising a granular or finely divided relatively oil-free vegetable material, and subsequently completely providing each individual vegetable particle coated and/or impregnated with a material rich in a fat-soluble vitamin with a protective air-excluding film of gelatin which will provide a protective coating for the vitamins. The particles of vegetable material which have been coated and/or impregnated with a material rich in a fat-soluble vitamin may readily be provided with the outer protective film of gelatin by dispersing the particles in a gelatin solution, whereby each particle becomes coated with an air-excluding film of gelatin. The mass is then dried to produce a dry, stable, highly potent vitamin product which may be used as such or employed for the fortification of foods or feeds which it is desired to enrich with the fat-soluble vitamins. Preferably, however, the dry, fat-soluble vitamin-containing product is prepared by forming a slurry of the vegetable material with an aqueous gelatin solution and then admixing the fat-soluble vitamin-rich material therewith and subsequently drying the mass. By this procedure, protein, pectin, carbohydrates and other natural hydrophilic substances present in the vegetable material are extracted therefrom by the aqueous gelatin solution. The vitamin-containing material when admixed with the slurry is then absorbed into the vegetable material, and on drying the slurry the vegetable particles bearing the fat-soluble vitamins are coated not only with the natural hydrophilic substances which were extracted from the vegetable particles, but also with gelatin thus providing a highly efficient protection for the vitamins. Alternatively, the slurry may be prepared by using water rather than an aqueous gelatin solution, and the gelatin then added after the fat-soluble vitamin-containing material has been added thereto, the gelatin being added either in the dry form or as a concentrated aqueous solution. The expression "bearing" is used herein to connote both particles which are coated and particles which are impregnated with vitamin-rich material.

Any suitable natural or synthetic material rich in any one or more of the fat-soluble vitamins A, D and E may be used according to the invention, the corresponding pro-vitamins being included under the generic expression "vitamins." It is preferred to use animal, vegetable or fish oils rich in the fat-soluble vitamins, such as cod liver, shark liver, halibut liver, tuna liver, sardine, palm and like oils, fractions or concentrates thereof or such oils fortified with vitamin concentrates. Other sources of the fat-soluble vitamins, such as chemically or electrically activated sterols, e. g. irradiated ergosterol, irradiated 7-dehydrochloesterol, and the like, may also be used alone or in conjunction with the aforementioned or other vitamins. While the food materials employed as the carrier in most cases contain vitamins $B_1$ and G, additional quantities of these vitamins, as well as other water-soluble vitamins such as vitamin C, pyridoxine, niacin, pantothenic acid, biotin, or the like, may be added.

Various vegetable materials may be used as the carrier base for the vitamin-rich material. In the production of dry vitamin products to be used as such for animal foods or for the enriching of animal feeds, we prefer to use either vegetable meals or finely divided vegetable pulps. When preparing products to add to animal feeds a carrier similar to the animal feed is preferably used. Materials which have been found to function very satisfactorily in the process herein described include, inter alia, meals prepared from oil-bearing seeds after removing most of the oil contained therein by the cold pressing process, by the expeller process, or by solvent extraction processes which yield a relatively oil-free meal. Such meals may be obtained from cottonseed, maize, flaxseed, sesame seed, soya beans, peanuts, copra, cocoa beans, wheat germ, etc. Meals prepared from cereals or other vegetative materials relatively low in oil content may also be used, such as oatmeal, barley meal, wheat meal, hominy meal, alfalfa, dried grass powder, etc. By-products of the distilling industry, such as dried distillers corn solubles and dried distillers rye solubles may be employed. In preparing vitamin products for human consumption it may in some cases be preferable to use cereal carriers. While some of these vegetable materials, and particularly the meals produced from oil-bearing seeds by the aforementioned processes, may contain up to about 8 per cent oil, the expression "relatively oil-free vegetable material" will be used herein to connote the broad class of materials which may be used, including such seed meals.

In carrying out the process of our invention a vitamin-rich material is admixed with the product selected as the carrier. For purposes of convenience, the process of the invention will be described with reference to the use of a vegetable meal as the carrier. However, it is to be understood that the process of the invention may be carried out by using any of the other carriers mentioned above or similar carriers. The vitamin-rich material is preferably added gradually to the vegetable meal with constant agitation to insure a thorough dispersion of the vitamin material in the vegetable meal. During this mixing process the meal particles are coated and/or impregnated with the vitamin-rich material. In the preferred embodiment of the invention wherein the meal particles are coated and/or impregnated with a material rich in a fat-soluble vitamin by first forming a slurry of the meal particles with a gelatin solution, and then admixing the vitamin-containing material therewith, the vitamin-rich material is also preferably added gradually with agitation so as to insure uniform dispersion thereof.

The vitamin-bearing meal particles, if they have been formed by the dry-mixing process, are coated with gelatin by any suitable means, preferably by dispersing the particles in an aqueous gelatin solution and subsequently drying the coated particles. If on drying, the coated particles, either when prepared by the dry-mixing process and subsequently coated with gelatin, or when prepared by the preferred wet-mixing process, tend to adhere to one another, the mass may be ground or powdered to a suitable particle size. The dry meal particles bearing the vitamin-rich material will be found to be coated with an air-excluding film of gelatin. Where grinding is resorted to, care should be taken, however, not to grind the mass too finely or the gelatin film on some of the particles may be damaged to some extent thus lessening the stability of the product. None of the vitamin-rich material will be on the outside of the particles, as is evidenced by the fact that if the coated meal particles of the invention are extracted with a fat solvent, such as ethylene dichloride or ethyl ether, little or no fat or oil will be obtained. The drying of the coated particles is preferably carried out under reduced pressure and/or in an inert atmosphere in order to obviate any destruction of the vitamins.

The percentage of gelatin in the solutions which are employed, and the ratio of gelatin solution to vegetable meal may vary considerably; however, we have found that in most cases it is preferable to employ solutions containing from about 3% to about 25% of gelatin, and to use at least about one part of gelatin solution for each part of vegetable meal, or in other words about 3 to 25 parts of gelatin per 100 parts of meal.

In all cases a dry product having excellent stability will be obtained. In some cases the stability of the vitamins may be enhanced still further by the inclusion of antioxidants in the product. Either water-soluble or oil-soluble antioxidants may be employed for this purpose. When using water-soluble antioxidants they may either be incorporated into the product by mixing the antioxidant with the meal before adding the vitamin-rich material thereto, or they may be dissolved in the gelatin solution and incorporated into the product when the gelatin solution is mixed with the vegetable meal. When using the wet mixing process of coating and/or impregnating the meal particles with a vitamin-rich material, the water-soluble antioxidants may be incorporated into the vitmain products by admixing the antioxidants with the meal slurry. In adding oil-soluble antioxidants to the product, they are preferably added by incorporating them into the vitamin-rich material prior to mixing it with the vegetable meal. Suitable antioxidants include, inter alia, vitamin C, otherwise known as ascorbic acid, natural oil-soluble vegetable antioxidants produced by the processes of copending applications of Buxton Serial Nos. 351,909, filed August 8, 1940, now Patent No. 2,345,576, and 397,547, filed June 11, 1941, now Patent No. 2,345,578, and similar natural antioxidants produced by other processes, etc.

Prior to admixing the vitamin-rich material with the relatively oil-free vegetable meal, the meal may be treated with acetic acid in accordance with the process disclosed in the copending application of Briod and Buxton, Serial No. 442,080 filed concurrently herewith, now Patent No. 2,345,571. In accordance with this process, the vegetable meal is subjected to the action of acetic acid in the presence or not of an organic solvent or solvent-mixture in order to liberate natural antioxidants in the meal. Then, either with or without removing therefrom the acid and the solvent when the latter is used, adding a certain amount of water and the vitamin-containing material thereto, thoroughly and intimately mixing the oil and water with the vegetable material and the liberated antioxidants; and finally removing the water and any acid and solvent present from the mass to provide a dry vitamin-fortified vegetable material. If in the process of the present invention, it is desired to treat the vegetable meal in accordance with the process of the above-identified application, one may add an aqueous solution of gelatin to the vegetable meal instead of adding water after treating the meal with the acetic acid, or one may coat the dried, vitamin-bearing vegetable meal particles with gelatin in any suitable manner as described hereinabove. When the vitamin-containing material is admixed with the acetic acid-treated vegetable meal it will be brought into intimate contact with the liberated natural antioxidants and thus afforded further protection against oxidative deterioration. For further details of this process reference may be had to the above-identified application.

After the vegetable meal particles bearing vitamin-rich material have been coated with gelatin and the particles dried, the mass may be used as such or it may be ground, crushed, or otherwise comminuted, so that it may be readily molded or pressed into predetermined shapes or blended or admixed with foods of a suitable type. In grinding or crushing the mass, the size of particles which are produced will depend to some extent upon the nature of the food into which it is desired to incorporate the vitamin product. The size of the particles preferably should be either the same or approximate that of the food to which they are to be added in order to inhibit settling during storage or transit.

In order to minimize any oxidation or destruction of the vitamins during the production of the vitamin product, the process of producing the vitamin products may be carried out under an inert atmosphere such as an atmosphere of nitrogen or carbon dioxide.

For a fuller understanding of the nature and objects of the invention, reference should be had to the following examples which are given merely to further illustrate the invention and are not to be construed in a limiting sense, all parts given being by weight:

Example I

To 10 parts of crude fish liver oil containing 60,000 U. S. P. units of vitamin A/gm. and 9,000 U. S. P. units of vitamin D/gm. were added 110 parts of cottonseed meal and the said materials thoroughly mixed. A relatively dry material resulted. To 50 parts of this dry mixture were added 5 parts of gelatin which had been dissolved previously in 20 parts of warm (40°–50° C.) water. These materials while maintained at a temperature of about 50° C. were thoroughly mixed in order to coat each minute particle of the meal, which had absorbed therein crude fish liver oil, with a thin layer of gelatin. After the mixture was thoroughly dry, it was pulverized and, upon extracting with ethylene dichloride, it gave no evidence of oil on the surface of the particles thus indicating that the oil-meal particles were the internal phase—thereby protecting the vitamins against oxidation.

Example II 3 parts of fish liver oil containing 103,500 U. S. P. units of vitamin A and 24,200 U. S. P. units of vitamin D per gram were thoroughly mixed with 27 parts of soybean meal. To this mixture there were added 3 parts of gelatin dissolved in 24 parts of water. The mass was mixed for 20 minutes in the presence of carbon dioxide and the excess moisture then driven off by heating at a temperature of about 140° F. under a reduced pressure. When the mixture was thoroughly dried, it was ground to a suitable particle size. This product showed excellent stability on extended storage.

Example III 20 parts of soybean meal were made into a paste with forty parts of water, containing dissolved therein 3 parts of gelatin. 2 parts of a blend of shark liver oil and tuna liver oil containing 68,600 U. S. P. units of vitamin A/gm. and 9,200 U. S. P. units of vitamin D/gm. were added and thoroughly stirred in. The mixture was dried, ground. The resulting product was non-oily and exhibited excellent stability.

Example IV 700 parts of acetone containing 5% glacial acetic acid were added to 900 parts of soybean meal and the mixture agitated for two hours to liberate the natural antioxidants in the meal. The solvent was removed by vacuum distillation and the treated meal was made into a paste with 1800 parts of water. 91 parts of a shark-tuna liver oil blend such as was employed in Example III were added and mixed into the mass. This was all carried out in an atmosphere of carbon dioxide. The mixture was then dried at 140° F. under a reduced pressure, and ground and the particles coated with gelatin as described in Example I. The product exhibited excellent stability.

Example V

A dry gelatin coated product was prepared similarly as in Example IV with the exception that instead of mixing the meal with water to form a paste, a 3% solution of gelatin was used. When the vitamin-containing oil had been admixed with the paste and the mixture dried and ground, it was found that each meal particle bearing the vitamin-rich material had an outer protective coating of gelatin, and it was thus not necessary to give the meal particles a further coating of gelatin. After an extended storage period, the vitamin potency of the product was unchanged.

Example VI

In this example a dry vitamin carrier was prepared in the manner set forth in Example IV, the principal difference being that the water which was employed in preparing the meal paste contained 0.0625% of d-iso-ascorbic acid as an antioxidant. The vitamin-containing oil was thoroughly admixed with the meal paste and the mass dried and ground, the resulting vitamin-bearing particles were then coated with an aqueous solution of gelatin and dried and ground to a suitable particle size. The finished product exhibited excellent vitamin stability.

It is evident from the above description that we have produced stable highly potent dry vitamin carriers which are suitable for fortifying human and animal foods and feeds. The vitamin-rich dry carrier of the invention may be used to fortify dry or welt poultry mashes, prepared animal feeds, cereals, or flours produced therefrom, milk powder, malt powder, etc., or for the production of vitamin-bearing tablets of increased stability which may or may not have an exterior sugar or like coating, etc.

While the invention is particularly concerned with the incorporation into a vegetable carrier of vitamins A, D and/or E, the other vitamins, such as $B_1$, C and G may also be incorporated individually or collectively along with either one or more of the vitamins A, D and/or E. From the foregoing it is clear that a stable edible vitamin fortified product in dry form has been successfully produced. As hereinbefore stated, the vitamin potency of the dried product is maintained substantially constant for relatively long periods of time.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent, is:

1. A vitamin-fortified product comprising relatively oil-free vegetable particles bearing a fat-soluble vitamin and each particle having an outer protective film composed of gelatin and hydrophilic substances derived from said vegetable particles.

2. A vitamin-fortified product comprising oil-bearing seed meal particles bearing a fat-soluble vitamin and each particle having an outer protective film composed of gelatin and hydrophilic substances derived from said seed meal particles.

3. A vitamin-fortified product comprising soya bean particles bearing a fat-soluble vitamin and each particle having an outer protective film composed of gelatin and hydrophilic substances derived from said soya bean particles.

4. A vitamin-fortified product comprising flaxseed particles bearing a fat-soluble vitamin and each particle having an outer protective film composed of gelatin and hydrophilic substances derived from said flaxseed particles.

5. A vitamin-fortified product comprising cottonseed particles bearing a fat-soluble vitamin and each particle having an outer protective film composed of gelatin and hydrophilic substances derived from said cottonseed particles.

6. A process of producing a stable vitamin-fortified product which comprises forming a slurry of a comminuted relatively oil-free vegetable material with an aqueous gelatin solution, said aqueous gelatin solution serving to extract the natural hydrophilic substances present in the vegetable material, admixing a fat-soluble vitamin-containing material with the slurry and drying the same to produce a mass of individual vegetable particles bearing the vitamin material, each particle having an outer protective film composed of gelatin and the extracted hydrophilic substances.

7. A process of producing a stable vitamin-fortified product which comprises forming a slurry of an oil-bearing seed meal with an aqueous gelatin solution, said aqueous gelatin solution serving to extract the natural hydrophilic substances present in the vegetable material, admixing a fat-soluble vitamin-containing material with the slurry and drying the same to produce a mass of individual vegetable particles bearing the vitamin material, each particle having an outer protective film composed of gelatin and the extracted hydrophilic substances.

8. A process of producing a stable vitamin-fortified product which comprises forming a slurry of soya bean meal with an aqueous gelatin solution, said aqueous gelatin solution serving to extract the natural hydrophilic substances present in the vegetable material, admixing a fat-soluble vitamin-containing material with the slurry and drying the same to produce a mass of individual vegetable particles bearing the vitamin material, each particle having an outer protective film composed of gelatin and the extracted hydrophilic substances.

LORAN O. BUXTON.
ANDRÉ E. BRIOD.